(12) United States Patent
Prakash et al.

(10) Patent No.: US 11,696,213 B2
(45) Date of Patent: Jul. 4, 2023

(54) NETWORK SLICE DISCOVERY IN OVERLAPPING NETWORK SLICE DEPLOYMENT

(71) Applicant: Nokia Technologies Oy, Espoo (FI)

(72) Inventors: D Prakash, Bangalore (IN); Ankit Kumar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/040,900

(22) PCT Filed: Mar. 15, 2018

(86) PCT No.: PCT/EP2018/056536
§ 371 (c)(1),
(2) Date: Sep. 23, 2020

(87) PCT Pub. No.: WO2019/174735
PCT Pub. Date: Sep. 19, 2019

(65) Prior Publication Data
US 2021/0144619 A1    May 13, 2021

(51) Int. Cl.
*H04W 48/08* (2009.01)
(52) U.S. Cl.
CPC .................. *H04W 48/08* (2013.01)
(58) Field of Classification Search
CPC .............. H04W 76/11; H04L 29/08
See application file for complete search history.

(56) References Cited

U.S. PATENT DOCUMENTS

| | | | |
|---|---|---|---|
| 2017/0332421 A1 | 11/2017 | Sternberg et al. | |
| 2018/0007552 A1* | 1/2018 | Bae | H04W 12/041 |
| 2018/0352501 A1* | 12/2018 | Zhang | H04W 48/18 |
| 2019/0082326 A1* | 3/2019 | Mathison | H04W 8/18 |
| 2020/0053531 A1* | 2/2020 | Myhre | H04W 48/18 |
| 2020/0267639 A1* | 8/2020 | Wei | H04W 8/08 |
| 2020/0374793 A1* | 11/2020 | Watfa | H04W 36/06 |
| 2021/0136627 A1* | 5/2021 | Centonza | H04W 28/16 |

FOREIGN PATENT DOCUMENTS

CN          106572517 A       4/2017

OTHER PUBLICATIONS

Huawei, "Ng Slice available information," 3GPP TSG-RAN3 Meeting AH-1801, R3-180468, Jan. 12, 2018, 4 pages.

(Continued)

*Primary Examiner* — Fabricio R Murillo Garcia
(74) *Attorney, Agent, or Firm* — Tong, Rea, Bentley & Kim, LLC

(57) ABSTRACT

There are provided measures for enabling/realizing network slice discovery in an overlapping network slice deployment. Such measures exemplarily comprise registration of a network slice mapping between a network slice identification information and a network slice type information for at least one service-related network slice in an overlapping network slice deployment, said network slice type information being indicative of a service-related capability of the at least one service-related network slice, and identification of a service-related network slice in the overlapping network slice deployment on the basis of the registered network slice mapping and a service.

12 Claims, 16 Drawing Sheets

(56) References Cited

OTHER PUBLICATIONS

ZTE Corporation, "NW slicing for high layer functional split," 3GPP TSG-RAN WG3 NR AdHoc, RS-180139, Jan. 22-26, 2018, 7 pages.
Huawei, et al., "Network Slice Instance Selection," 3GPP SA WG2 Meeting #122, S2-175296, Jun. 26-30, 2017, 22 pages.
Third Generation Partnership Project, "Network Slice Selection Services, 5G System," Stage 3, Release 15, 3GPP TS 29.531, v1.0.0, Mar. 2018, 34 pages.
Third Generation Partnership Project, "3GPP, Technical Specification Group Services and System Aspects, System Architecture for the 5G System," Stage 2, Release 15, 3GPP TS 23.501, v15.0.0, Dec. 22, 2017, 181 pages.
Third Generation Partnership Project, "3GPP, Technical Specification Group Services and System Aspects, Procedures for the 5G System," Stage 2, Release 15, 3GPP TS 23.502, v15.0.0, Dec. 22, 2017, 258 pages.
International Search Report and Written Opinion mailed in corresponding PCT/EP2018/056536 dated Sep. 21, 2018, 15 pages.
Chinese Office Action mailed in corresponding CN201880091286.5 dated Oct. 27, 2022, 9 pages.
Sharp, "DISC on DNN based congestion control and S-NSSAI based congestion control", 3GPP TSG-CT WG1 Meeting #108, C1-180247, Jan. 22-26, 2018, 6 pages.
Samsung, "Configured NSSAI clarification", SA WG2 Meeting #121, S2-173488, May 15-19, 2017, 2 pages.

* cited by examiner

```
User Details:            { Username, IMSI, Auth Token ... }
Location coordinates:    {LAT, LAN}
QoS Requirements:        {QCI, GBR, AMBR}
Application Details      {youtube.com, vimeo.com ...}
Details of Detected radio Networks:
                         {
                           Id 1 : { PLMN1, TAC1, Signal Strength}
                           Id2: {PLMN2, TAC2, Signal Strength}
                           ...
                         }
```

```
Response Type : SUCCESS
Slice info :    {
                Slice Id 1 {
                            ID : PLMN1, TAC1
                            Type : Video Slice
                            Duration Allowed : 1 Hr
                            Pricing Info : $2/GB/Hour
                            Mobility    : Allowed.
                }
                Slice Id 2 {
                            ID : PLMN2, TAC2
                            Type : AR Slice
                            Duration Allowed : 2 Hr
                            Pricing Info :
                                            $10/GB/Hour
                            Mobility    : Not Allowed.
                }
                ......
}
```

FIG. 9

```
MasterInformationBlock ::= SEQUENCE {
    dl-Bandwidth ENUMERATED { n6, n15, n25, n50, n75, n100},
    phich-Config PHICH-Config,
    systemFrameNumber BIT STRING (SIZE (8)),
    spare BIT STRING (SIZE (10))
}
```

| 4 Spare bits in MIB | Slice type |
|---|---|
| 0000 | SD Video Slice |
| 0001 | 720P Video Slice |
| 0010 | 1080P Video Slice |
| 0011 | Virtual Reality Slice |
| 0100 | AR Slice |
| 0101 | Tactile Internet Slice |
| 0110 | IoT sensor |
| 0111 | URL specific Slice |
| 1000 | Default Slice |
| 1001 | Random Slice #2 |
| 1010 | RESERVED |
| 1011 | RESERVED |
| 1100 | RESERVED |
| 1101 | RESERVED |

1300

FIG. 13

NETWORK SLICE DISCOVERY IN OVERLAPPING NETWORK SLICE DEPLOYMENT

CROSS-REFERENCE TO RELATED APPLICATIONS

The present application is a 371 application of PCT Patent Application Serial No. PCT/EP2018/056536, entitled "NETWORK SLICE DISCOVERY IN OVERLAPPING NETWORK SLICE DEPLOYMENT", and filed on Mar. 15, 2018, the entirety of which is incorporated by reference herein.

FIELD

The present disclosure relates to network slice discovery in an overlapping network slice deployment. More specifically, example embodiments relate to measures (including methods, apparatuses and computer program products) for enabling/realizing network slice discovery in an overlapping network slice deployment.

BACKGROUND

The present disclosure generally relates to communication systems implementing a network slicing technique, such as communication systems under 3GPP 5 G/NR standardization. A network slicing technique employs the concept of network slicing which is a kind of virtual network architecture which leverages the principles behind network functions virtualization and software-defined networking. Accordingly, network slicing is a concept for running multiple logical networks on a common physical infrastructure, wherein each network slice represents an independent virtualized (at least partial) end-to-end network or, stated in other words, a logical (at least partial) end-to-end construct, and allows operators to run different virtualized networks or logical constructs in parallel. The term network slice as used herein shall thus refer to a specific instance of such virtualized network or logical construct. Since multiple network slices can serve the same communication device at different occasions based on certain needs, multiple network slices will coexist in the same geographic location. Herein, such situation shall be referred to as overlapping network slice deployment.

In such overlapping network slice deployment, in which multiple network slices can serve the same communication device and a communication device can thus obtain services from multiple network slices, the communication device needs to know which network slice provides a desired/necessary service. Since network slices are generally dynamic in nature, the communication device needs to be able to discover an applicable/suitable network slice. Accordingly, there is room for improvement for communication systems implementing a network slicing technique in enabling/realizing network slice discovery in an overlapping network slice deployment.

SUMMARY

Various example embodiments of the present disclosure aim at addressing at least part of the above issues and/or problems and drawbacks.

Various aspects of example embodiments of the present disclosure are set out in the appended claims.

According to an exemplary aspect of the present disclosure, there is provided a method comprising registering a network slice mapping between a network slice identification information and a network slice type information for at least one service-related network slice in an overlapping network slice deployment, said network slice type information being indicative of a service-related capability of the at least one service-related network slice, and identifying a service-related network slice in the overlapping network slice deployment on the basis of the registered network slice mapping and a service.

According to an exemplary aspect of the present disclosure, there is provided a method comprising providing, to a communication-enabled device, an information regarding a network slice mapping between a network slice identification information and a network slice type information for at least one service-related network slice in an overlapping network slice deployment, said network slice type information being indicative of a service-related capability of the at least one service-related network slice, wherein said information facilitating identification of a service-related network slice for a service in the overlapping network slice deployment.

According to an exemplary aspect of the present disclosure, there is provided an apparatus comprising at least one processor and at least one memory including a computer program code, wherein the at least one memory and the computer program code are configured, with the at least one processor, to cause the apparatus to at least perform: registering a network slice mapping between a network slice identification information and a network slice type information for at least one service-related network slice in an overlapping network slice deployment, said network slice type information being indicative of a service-related capability of the at least one service-related network slice, and identifying a service-related network slice in the overlapping network slice deployment on the basis of the registered network slice mapping and a service.

According to an exemplary aspect of the present disclosure, there is provided an apparatus comprising at least one processor and at least one memory including a computer program code, wherein the at least one memory and the computer program code are configured, with the at least one processor, to cause the apparatus to at least perform: providing, to a communication-enabled device, an information regarding a network slice mapping between a network slice identification information and a network slice type information for at least one service-related network slice in an overlapping network slice deployment, said network slice type information being indicative of a service-related capability of the at least one service-related network slice, wherein said information facilitating identification of a service-related network slice for a service in the overlapping network slice deployment.

According to an exemplary aspect of the present disclosure, there is provided an apparatus comprising means for registering a network slice mapping between a network slice identification information and a network slice type information for at least one service-related network slice in an overlapping network slice deployment, said network slice type information being indicative of a service-related capability of the at least one service-related network slice, and means for identifying a service-related network slice in the overlapping network slice deployment on the basis of the registered network slice mapping and a service.

According to an exemplary aspect of the present disclosure, there is provided an apparatus comprising means for providing, to a communication-enabled device, an information regarding a network slice mapping between a network slice identification information and a network slice type information for at least one service-related network slice in an overlapping network slice deployment, said network slice type information being indicative of a service-related capability of the at least one service-related network slice, wherein said information facilitating identification of a service-related network slice for a service in the overlapping network slice deployment.

According to an exemplary aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of example embodiments of the present disclosure, higher-layer beam failure detection, i.e. beam failure detection in a higher layer such as a MAC entity, can be enabled/realized in an improved manner. Hence, reliable and cost-effective measures/mechanism for discovering network slices (i.e. their types and/or capabilities) by end devices can be provided.

BRIEF DESCRIPTION OF THE DRAWINGS

In the following, the present disclosure will be described in greater detail by way of non-limiting examples with reference to the accompanying drawings, in which FIG. 8 shows an example of contents of a request for network slice information in the first exemplary variant according to one or more example embodiments, FIG. 9 shows an example of contents of a response for network slice information in the first exemplary variant according to one or more example embodiments, FIG. 12 shows an example of contents of a system information broadcast in the second exemplary variant according to one or more example embodiments, FIG. 13 shows an example of contents of a network slice information mapping/database in the second exemplary variant according to one or more example embodiments.

DETAILED DESCRIPTION

Figure 1:
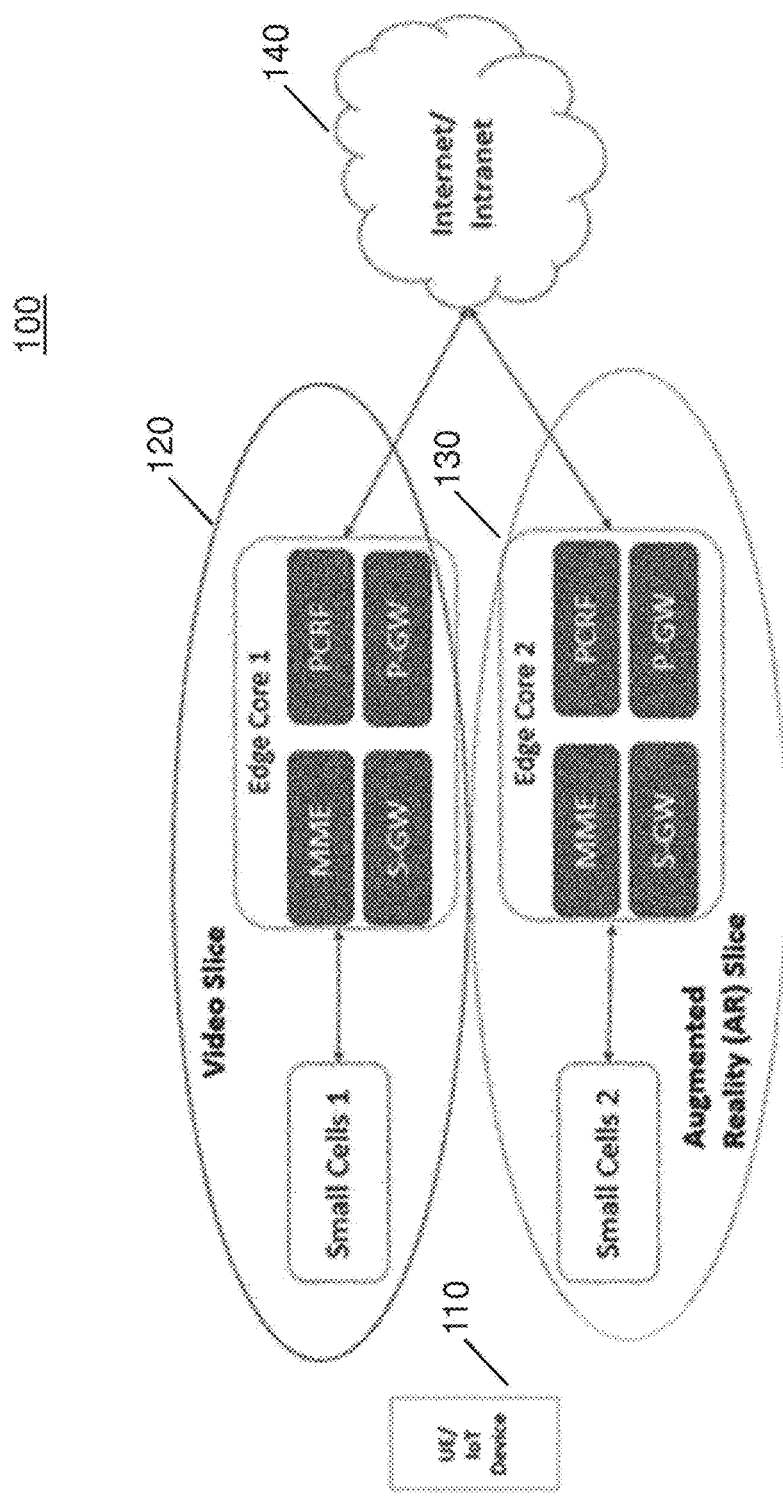
FIG. 1 shows a schematic diagram illustrating the concept of network slicing underlying one or more example embodiments.

The present disclosure is described herein with reference to particular non-limiting examples and to what are presently considered to be conceivable embodiments. A person skilled in the art will appreciate that the present disclosure is by no means limited to these examples and embodiments, and may be more broadly applied.

It is to be noted that the following description of the present disclosure mainly refers to specifications being used as non-limiting examples for certain exemplifying network configurations and system deployments. Namely, the present disclosure is mainly described in relation to 3GPP specifications, specially referring to 5 G/NR standardization, being used as non-limiting examples. As such, the description of example embodiments given herein specifically refers to terminology which is directly related thereto. Such terminology is only used in the context of the presented nonlimiting examples and embodiments, and does naturally not limit the present disclosure in any way. Rather, any other system configuration or deployment may equally be utilized as long as complying with what is described herein and/or example embodiments described herein are applicable to it.

Hereinafter, various example embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described example embodiments and implementations to consist of only those features that have been mentioned, and such example embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to example embodiments of the present disclosure, in general terms, there are provided measures (including methods, apparatuses and computer program products) for enabling/realizing network slice discovery in overlapping network slice deployment.

The present disclosure is generally based on the concept of network slicing, as applied e.g. in communication systems under 3GPP 5 G/NR standardization. In the following, the concept of network slicing is briefly explained, in addition to the explanations given in the background section, which equally apply here as well.

Network slicing will help to create dedicated end-to-end or partial resource reservation in a dynamic manner, which is particularly useful for communication system with high demands on throughput and/or latency. For example, for networked CCTV cameras installed in a sensitive location, streaming the HD video may need dedicated resources reserved for a long time. Network slicing can help to address this issue/problem by creating a (virtualized/logical) end-to end network dedicated only for this video application.

Various use cases are conceivable in this context, while three exemplary use cases are describes below as non-limiting examples for illustrative purposes only.

A first use case, a factory environment can be considered. In a factory, there can be different types of sensors or IoT devices (as communication devices), such as sensors or IoT devices to monitor the machines, track employees, sense factory working conditions (pressure, temperature, humidity) and surveillance cam eras. These sensors or IoT devices collect data of different criticality and thus, will have different QoS needs. Different network slices with different characteristics can be dynamically created to meet the needs of these different applications or services.

As a second use case, a virtual/augmented reality environment can be considered. A mobile device or UE (as a communication device) may attach to different network slices depending on the application needs. Virtual reality and/or augmented reality applications need high bandwidth and low latency. Thus, it makes sense to build a dedicated network slice to meet the needs of such application or service. The mobile device or UE can attach to the network slice created for such special needs to avail the application or service.

As a third use case, a public environment such as e.g. a football stadium can be considered. In such scenario, the dynamic nature of network slicing can be illustrated, as follows. Initially, it is assumed that the football stadium has one network slice to handle web traffic. For the dynamic nature of the applications or services requested by the users, it is assumed that users of a first group in the stadium predominantly use Facebook, for what a Facebook URL specific network slice is created, and that users of a second group arriving at the stadium predominantly use live streaming of video to YouTube, for what a YouTube URL specific network slice is created. Accordingly, two network slices are (additionally) created in a dynamic manner to meet the needs of the dynamically changing crowd requirement.

In terms of its dynamic nature, it is to be noted that network slices typically support slice polymorphism, enabling transform at ion between different types of slices, such as e.g. a video slice can transform itself into an AR slice through reconfigurations. Thereby, the need for detaching from one slice and reattaching to another slice can be prevented when the user needs change.

FIG. 1 shows a schematic diagram illustrating the concept of network slicing underlying one or more example embodiments.

As shown in FIG. 1, a communication system 100, which is representative of an overlapping network slice deployment, comprises two network slices, i.e. a video slice 120 for providing a video service (for/in/of an application requiring such video service) and an AR slice 130 for providing an augmented reality service (for/in/of an application requiring such augmented reality service). The network slices 120 and 130 are configured and optimized to satisfy the needs of different applications and are implemented using underlying physical infrastructure, which is exemplarily illustrated by blocks denoted cells and core network elements/functions.

A communication device 110 is served by and can thus obtain services from both network slices 120 and 130 (if attached thereto) based on application/service needs, and such services can be provided by use of an external network or system which is exemplified as Internet/Intranet 140. When the communication device 110 wants to stream HD video, it will attach to the video slice 120, and when the communication device 110 wants to perform an AR application, it can attach to the AR slice 130. So, the communication device 110 can be attached to one or more network slices at a time.

Since multiple network slices can serve the same communication device at different occasions based on the needs, multiple network slices will coexist in the same geographic location, which can be referred to as overlapping network slice deployment. For example, in an overlapping network slice deployment, there may be a situation in which a network slice for providing a video service, a network slice for providing a VR service and a network slice for providing a Tactile Internet service coexist as service-related network slices. Additionally, a management network slice can/will coexist with one or more service-related network slices, wherein the management network slice is for managing (and re-/configuring) the service-related network slices, rather than providing some (application-related) service like the service-related network slices.

As indicated above, a challenge in such overlapping network slice deployment is that the communication device needs to know which network slice provides a desired/necessary service. Since network slices are generally dynamic in nature, the communication device needs to be able to discover an applicable/suitable network slice.

Therefore, example embodiments of the present disclosure provide for the ability of network slice discovery by communication devices such that communication devices are enabled to identify and attach to different network slices based on their needs (in view of the desired/necessary service or application).

Figure 2:
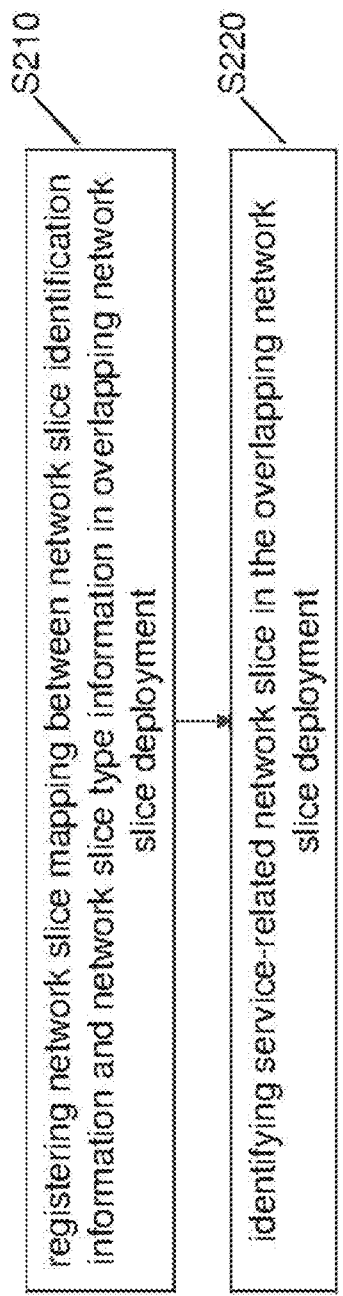
FIG. 2 shows a flowchart illustrating an example of a method, operable at or by a communication device, according to one or more example embodiments.

FIG. 2 shows a flowchart illustrating an example of a method, operable at or by a communication device, according to one or more example embodiments. The method of FIG. 2 is operable at or by (can be executed by) a communication-enabled device capable of communicating with a network element or function of a communication system implementing a network slicing technique, i.e. a communication device such as e.g. a mobile device, an IoT device, a sensor communicable in a 5 G system.

As shown in FIG. 2, a method according to one or more example embodiments comprises an operation (S210) of registering a network slice mapping between a network slice identification information and a network slice type information for at least one service-related network slice in an overlapping network slice deployment, said network slice type information being indicative of a service-related capability of the at least one service-related network slice, and an operation (S220) of identifying a service-related network slice in the overlapping network slice deployment on the basis of the registered network slice mapping and a service.

Figure 3:
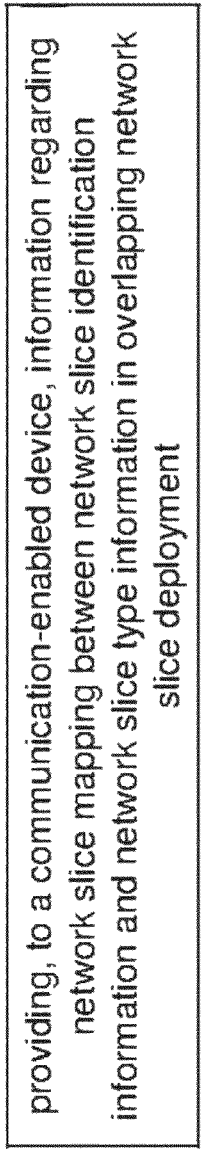
FIG. 3 shows a flowchart illustrating an example of a method, operable at or by at least one network element or function, according to one or more example embodiments.

FIG. 3 shows a flowchart illustrating an example of a method, operable at or by at least one network element or function, according to one or more example embodiments. The method of FIG. 3 is operable at or by (can be executed by) a network element or function of a communication system implementing a network slicing technique, such as a network element or function implementing the management network slice and/or a network element or function implementing a horn e subscriber system, wherein such network element or function is (directly or indirectly) communicable with a communication device such as e.g. a mobile device, an IoT device, a sensor communicable in a 5 G system.

As shown in FIG. 3, a method according to one or more example embodiments comprises an operation (S310) of providing, to a communication-enabled device, an information regarding a network slice mapping between a network slice identification information and a network slice type information for at least one service-related network slice in an overlapping network slice deployment, said network slice type information being indicative of a service-related capability of the at least one service-related network slice, wherein said information facilitating identification of a service-related network slice for a service in the overlapping network slice deployment.

In view of the aforementioned methods, a network slice can be identified and thus discovered, which is applicable/suited for (providing) the service which is desired/necessary in view of prevailing needs/requirements (e.g. need/requirements of an underlying application for which the service is desired/necessary). That is, when the communication device wants to have a desired/necessary service, it can be provided therewith by enabling attachment to the applicable/suited network slice for (providing) this service upon identification of this applicable/suited network slice.

In this regard, a network slice mapping represents a correlation/assignment between a network slice identification information and a network slice type information per network slice (wherein network slice identification information and network slice type information represent network slice information). That is, for any available network slice, information for identifying the network slice and information for indicating the type and/or capability of network slice are related to each other in such network slice mapping.

As detailed below, various implementations/realizations of the above outlined methods are conceivable. For example, the network slice identification information can be/comprise a tracking area identity which is assigned to a service-related network slice (see first exemplary variant described below), or the network slice identification information can be/comprises a network slice identifier which is assigned to a service-related network slice (see second exemplary variant described below).

In the following, a first exemplary variant according to one or more example embodiments is described. For illustrative purposes (yet without intention of limitation), the first exemplary variant could be denoted as network slice discovery based on tracking area identity (or, stated in other words, tracking area identifier).

In the first exemplary variant, the network slice identification information is/comprises a tracking area identity which is assigned to a service-related network slice.

Example embodiments relating to the first exemplary variant are, in principle, based on the following considerations.

A Tracking Area (e.g. in LTE) is a logical grouping of eNodeB's, i.e. base station elements. The MME tracks UE's in I OLE mode at Tracking Area level. Each Tracking Area is identified by a code called Tracking Area Code (TAC), and a TAC is a unique code that each operator assigns to each of their tracking areas.

A PLMN is a user's or device's horn e network. Each PLMN is identified by a PLMN ID, and a PLMN ID a unique code that is assigned to each operator network in the world. The PLMN ID can be defined as a combination of a Mobile Country Code (MCC), which identifies the country in which the PLMN is located, and a Mobile Network Code (MNC), which is a code identifying the PLMN in that country.

PLMN=MCC+MNC

A Tracking Area Identity (TAI) consists of (a combination of) a PLMN ID and a TAC (or, accordingly, a combination of a MCC, a MNC and a TAC). Hence, a TAI is uniquely identified globally, i.e. uniquely identifying a particular TAC in a particular PLMN.

TAI=PLMN+TAC=MCC+MNC+TAC

The TAI, i.e. a combination of a PLMN ID and a TAC or a combination of a MCC, a MNC and a TAC, can be used like/as a slice ID, i.e. a network slice identification information which helps to differentiate available/overlapping network slices. As indicated above, a management network slice (also referred to as MGMT slice) can be used to get information about available/overlapping network slices, i.e. network slice information.

In the first exemplary variant, each network slice has its own (unique) TAI as its network slice identification information. For example, the correlation/assignment can apply.

| Slice Type | PLMN | TAC |
| --- | --- | --- |
| Video Slice | 98765 [PLMN1] | 123 [TAC1] |
| Augmented Reality Slice | 12345 [PLMN2] | 456 [TAC2] |
| Virtual Reality Slice | 12345 [PLMN2] | 321 [TAC3] |

In this example, the Video Slice has {PLMN1, TAC1} as its network slice identification information, the Augmented Reality Slice has {PLMN2, TAC2} as its network slice identification information, and the Virtual Reality Slice has {PLMN2, TAC3} as its network slice identification information.

Accordingly, a corresponding network slice mapping is registered in a communication device (i.e. its database), including a management network slice and at least one service-related network slice.

Figure 4:
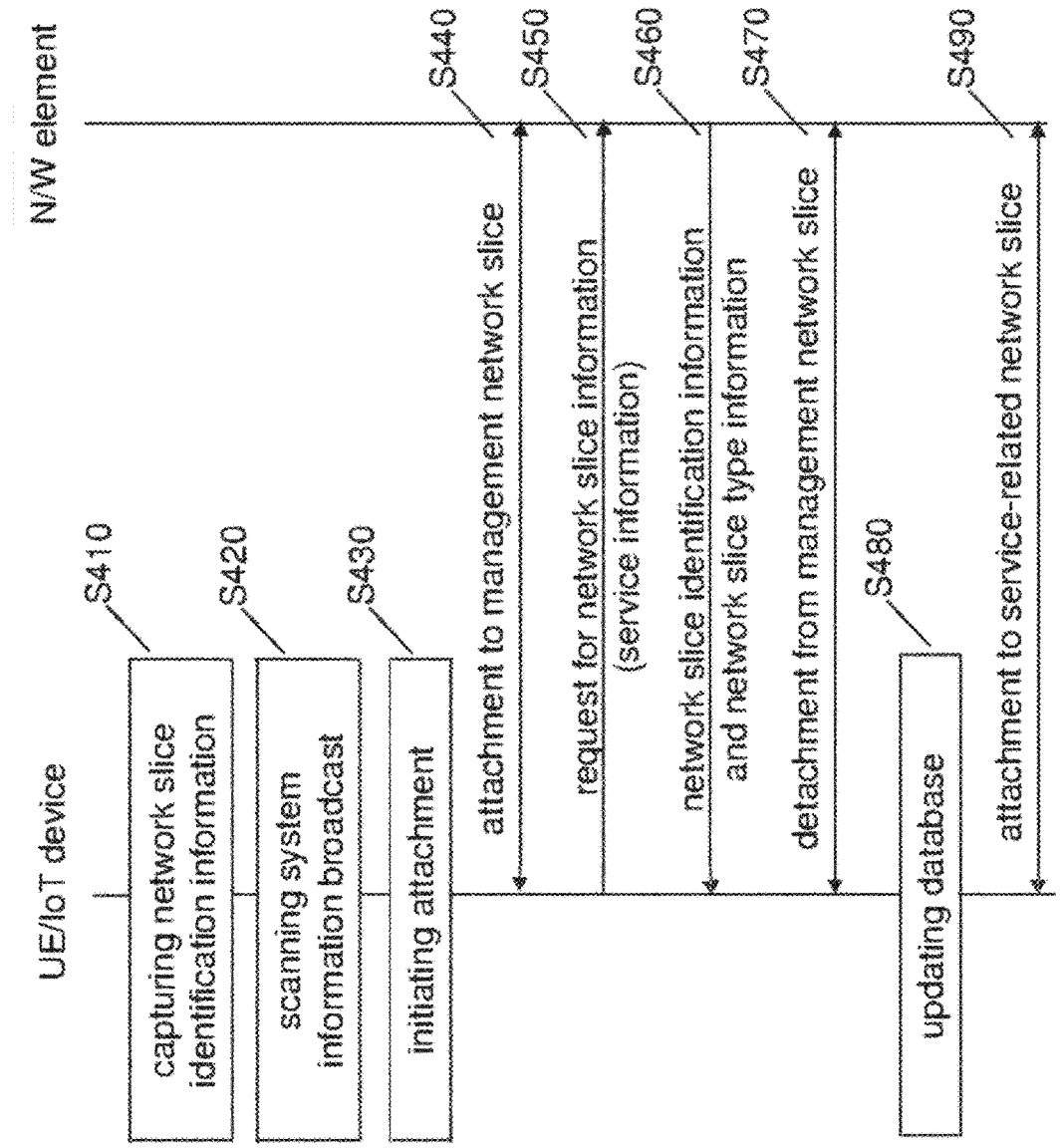
FIG. 4 shows a conceptual signaling diagram illustrating an example of a procedure in a first exemplary variant according to one or more example embodiments.

FIG. 4 shows a conceptual signaling diagram illustrating an example of a procedure in a first exemplary variant according to one or more example embodiments. In FIG. 4, a communication device (configured to perform the method illustrated in FIG. 2) is exemplified by "UE/IoT device", and a network element or function (configured to perform the method illustrated in FIG. 3) is exemplified by "N/W element".

As shown in FIG. 4, the UE/IoT device can attach to a management network slice in the overlapping network slice deployment (S440). Then, the UE/IoT device can request a network slice information of a service-related network slice suited for the service from the management network slice, i.e. issue a corresponding request to the N/W element (S450). Thereupon, the N/W element can obtain the request for the network slice information of the service-related network slice suited for the service via the management network slice in the overlapping network slice deployment (S450), and can issue, as the requested network slice information, a network slice identification information and a network slice type information for the service-related network slice suited for the service via the management network slice (S460). For example, ID: PLMN1, TAC1 and Type: Video Slice can be provided as the network slice information for a video slice in view of the above example correlation/assignment. Accordingly, the UE/IoT device can acquire, as the requested network slice information, the network slice identification information and the network slice type information for the service-related network slice suited for the service from the management network slice (S460). Then, the UE/IoT device can detach from the management network slice (S4 70). By way of these operations, the registration of the network slice mapping can be enabled/facilitated.

In this regard, the operation of S450 can comprise providing service information or, stated in other words, the request in S450 can comprise service information, i.e. an information about the service, such as application details and/or quality requirements of the service. An example of the contents of such request is illustrated in FIG. 8, and an example of the contents of a response to such request (in S460) is illustrated in FIG. 9.

For (enabling/facilitating) attachment to the management network slice, the UE/IoT device can capture a network slice identification information of the management network slice in the overlapping network slice deployment using an operator database (S410), scan a broadcasted system information for the captured network slice identification information of the management network slice (S420), and initiate attachment to the management network slice when the captured network slice identification information is found in the scanned system information (S430).

In this regard, the broadcasted system information (or, stated in other words, the system information broadcast) can comprise a system information of a type-1 system information block. That is, SIB-1 can be scanned in this regard.

Further, the UE/IoT device can update a database with the acquired network slice identification information and network slice type information as the registered network slice mapping (S480). Still further, the UE/IoT device can finally attach to the identified service-related network using its network slice identification information (as acquired by way of the aforementioned operations) for utilizing the service in the overlapping network slice deployment (S490).

For enabling a further understanding of the first exemplary variant, the following description of some conceivable implementation/realization approaches is given.

Figure 5:
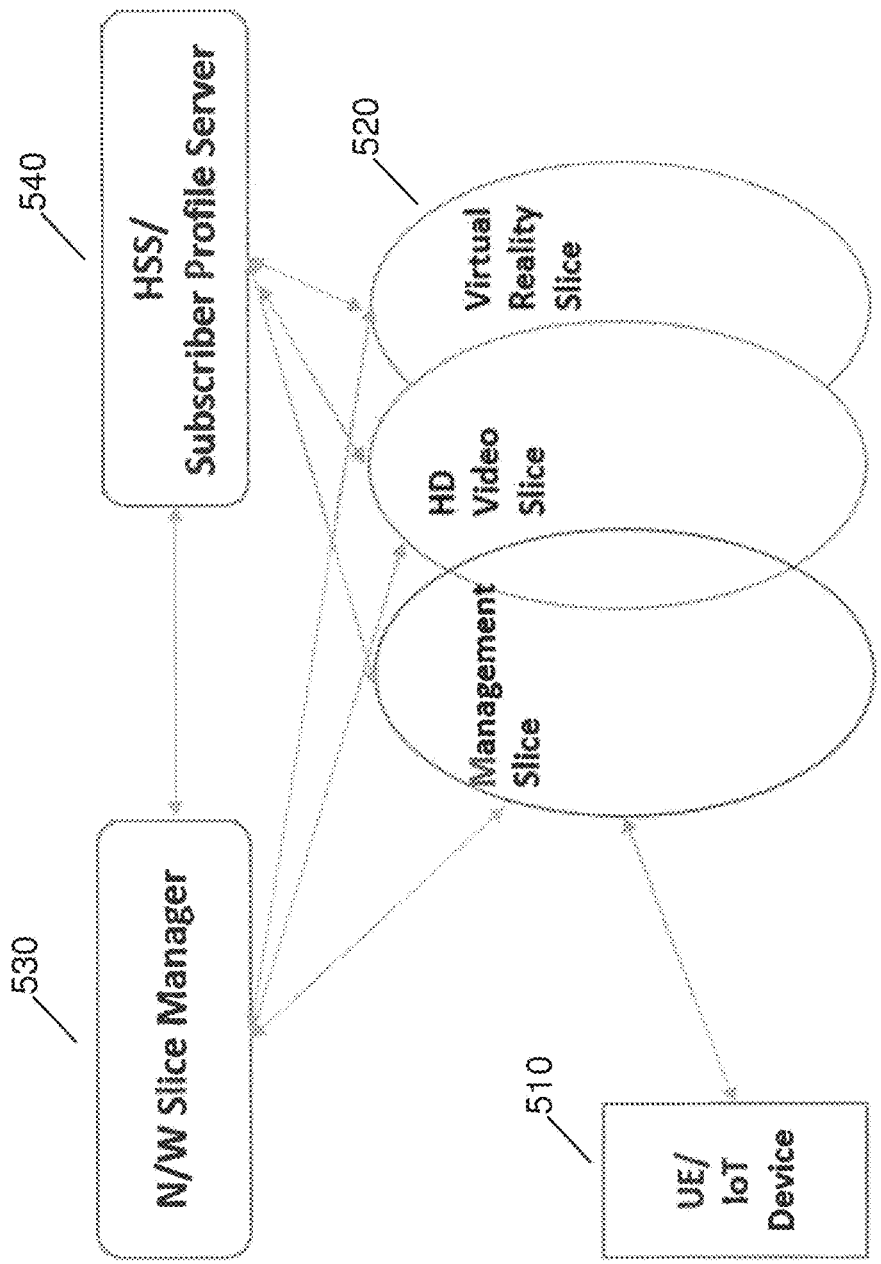
FIG. 5 shows a schematic diagram illustrating a logical system structure in the first exemplary variant according to one or more example embodiments.

FIG. 5 shows a schematic diagram illustrating a logical system structure in the first exemplary variant according to one or more example embodiments.

As shown in FIG. 5, a communication device 510 (exemplified as "UE/IoT device) is (virtually/logically) connected or linked an overlapping network slice deployment 520, in which a management network slice and at least one service-related network slice (here exemplified as HD Video Slice and Virtual Reality Slice) coexist. A N/W Slice Manager 530 and a HSS/Subscriber Profile Server 540 are (virtually/logically) connected or linked to each other, and are (virtually/logically) connected or linked to any one of the network slices of the overlapping network slice deployment 520, respectively. The Management Slice can be (regarded to be) located at the MME element or function of the underlying communication system.

Figure 6:
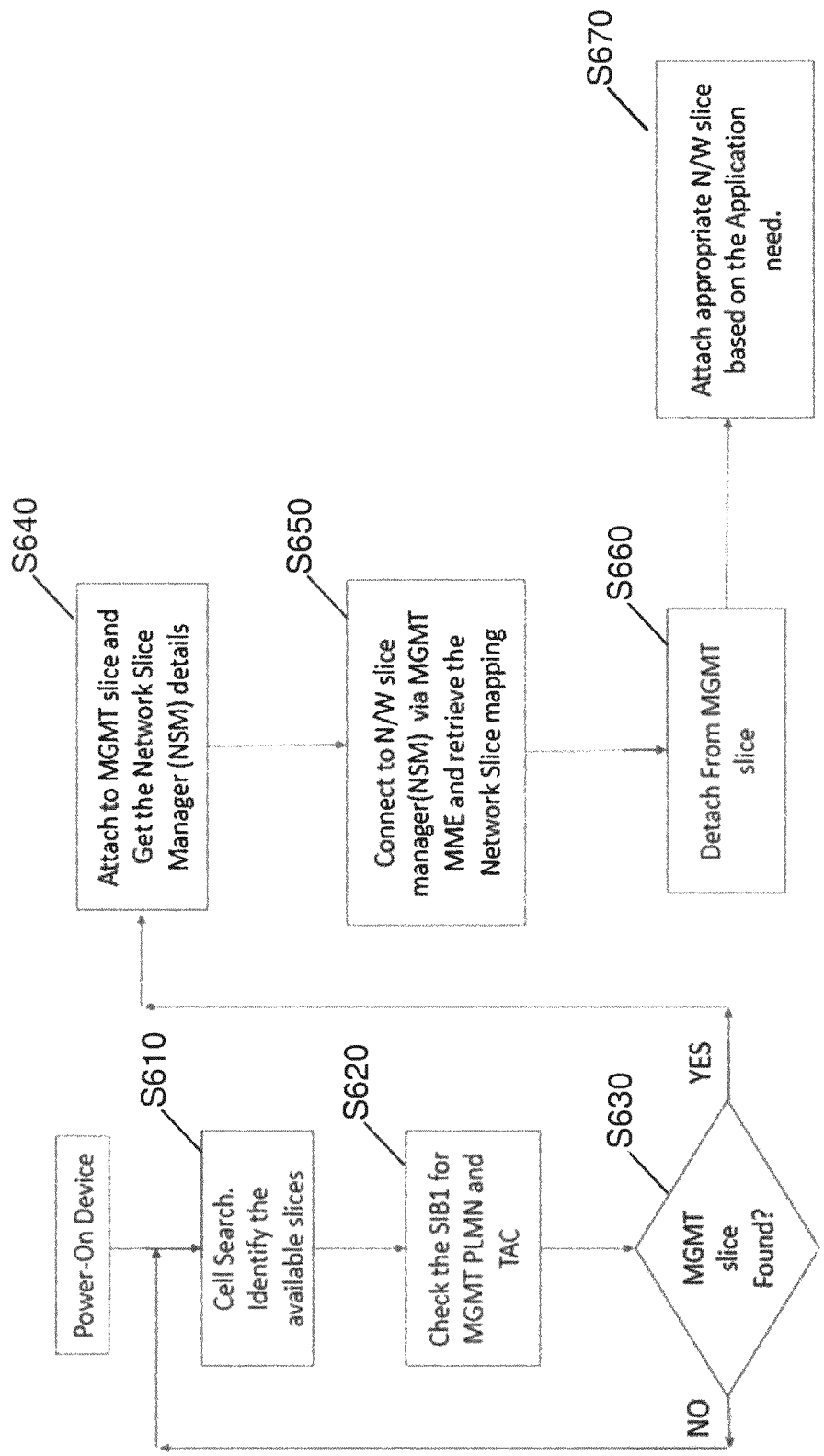
FIG. 6 shows a flowchart illustrating an example of a method, operable at or by a communication device, in the first exemplary variant according to one or more example embodiments.
Figure 7:
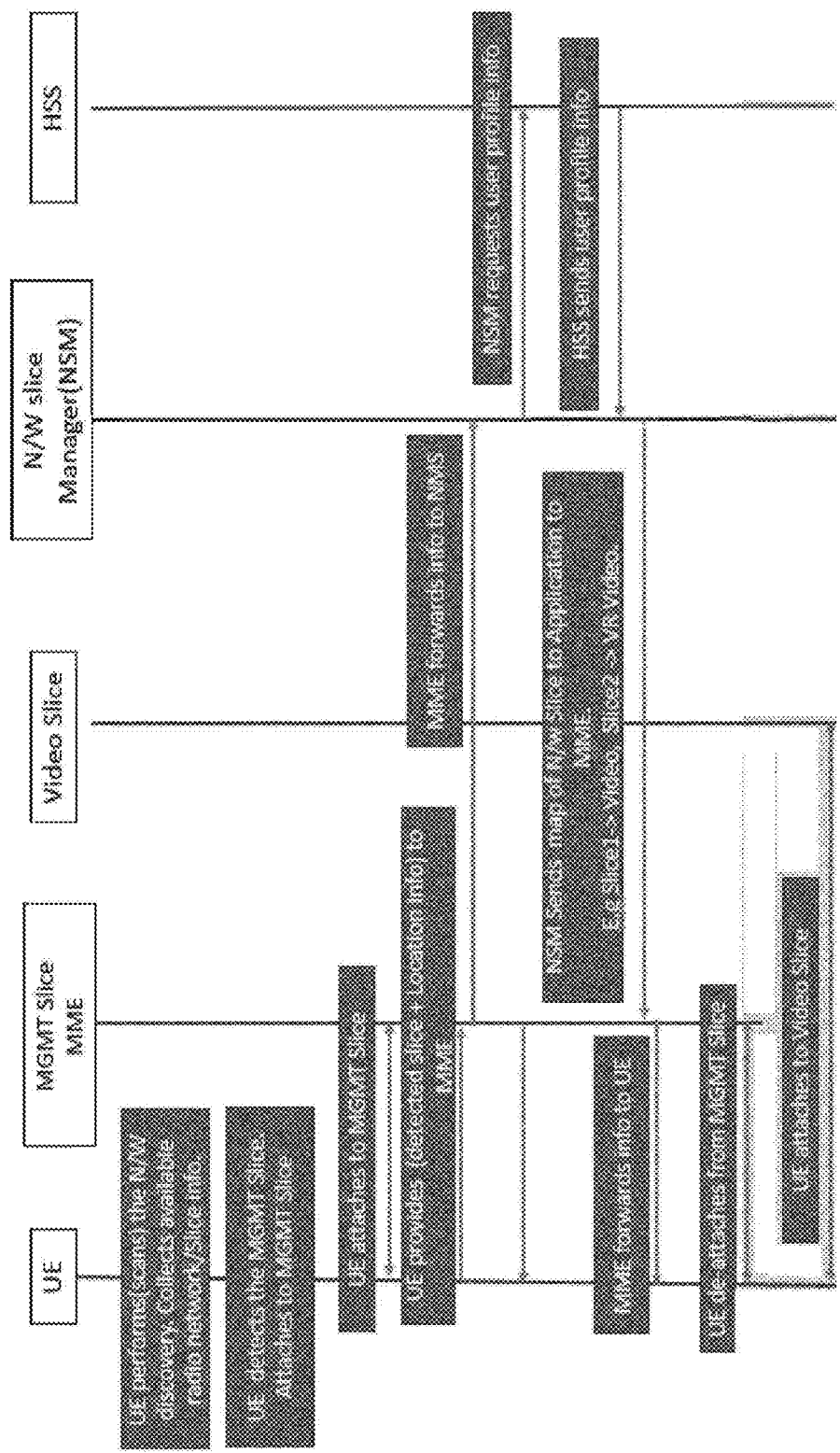
FIG. 7 shows a conceptual signaling diagram illustrating an example of a procedure in the first exemplary variant according to one or more example embodiments.

FIG. 6 shows a flowchart illustrating an example of a method, operable at or by a communication device, in the first exemplary variant according to one or more example embodiments, and FIG. 7 shows a conceptual signaling diagram illustrating an example of a procedure in the first exemplary variant according to one or more example embodiments. The method of FIG. 6 and the procedure of FIG. 7 are both (assumed to be) based on the logical system structure of FIG. 5.

As shown in FIGS. 6 and/or 7, an operational flow can for example be as follows, while certain operations could be omitted depending on various conditions such that respective information are already available or not needed in certain situations.

The device uses the operator database to identify the TAI of the management slice or uses the operator database to identify the TAC of the management slice and combine it with the operator's PLMN ID, as the management slice has a unique TAI globally (or a unique TAC in the operator's PLMN). This data can be downloaded by the device at the time of device activation. It can be modified based on the needs.

When the device powers up, it performs N/W discovery or cell search, thereby collecting information on available radio networks and network slices (S610). Then, the device detects the management slice, e.g. by checking the SIB-1 for the network slice information of the management slice (S620). For example, the device can synchronize to different carriers or bands (in its PLMN network) one by one and (attempt to) validate the TAC provided in the SIB-1 with the TAI or combination of PLMN and TAC of the management network slice which is already present in the device database.

On successful cell search, the device attaches to the management slice (YES in S630, S640). Otherwise, the device repeats the cell search (NO in S630, S610/S620). That is, if the TAI or combination of PLMN and TAC match between SI B-1 and device database is successful, the device proceeds with the attach to the management network slice, otherwise it moves on to the next best carrier frequency or frequency band.

Once the attach procedure completes, the device can download/retrieve the necessary network slice information via the management network slice. That is, the management network slice provides the TAI or combination of PLMN and TAC of one or more appropriate network slices for the device.

In this regard, the device requests the management network slice for the necessary network slice information of any available (service-related)

network slice which is applicable/suited for providing the desired/necessary service. To this end, the device can connect to the Network Slice Manger (NSM) via the management network slice, or the MME where the management network slice is located, and provide service information to the NSM to retrieve corresponding network slice information (S650). As regards the thus provided service information, reference is made to FIG. 8.

FIG. 8 shows an example of contents of a request for network slice information in the first exemplary variant according to one or more example embodiments. In this example, in request/information 800, (at least) the indicated QoS requirements and/or application details can be regarded as the service information.

Then, the NSM fetches subscriber profile from a database such as a database of the HSS or Subscriber Profile Server. The NSM is also aware of the current load on all network slices as it keeps polling for the same at certain intervals. Accordingly, the NSM can provide network slice information for one or more applicable/suited (service-related) network slices to the device also in consideration of slice load. On successful validation (using indicated user details and/or network details), the NSM returns the corresponding network slice information for the requested service/application. As regards, the thus provided network slice information, reference is made to FIG. 9.

FIG. 9 shows an example of contents of a response for network slice information in the first exemplary variant according to one or more example embodiments. In this example, in the response/information 900, the network slice information is given, including the respective slice type and slice identification (TAC).

In the illustrated example, the response/information 900 contains the network slice information, namely the TAI, including ID (consisting of PLMN and TAC), and the type, of any available network slice, here ID: PLMN1, TAC1 and Type: Video Slice for a video slice, and ID: PLMN2, TAC2 and Type: AR Slice for an augmented reality slice, in accordance with the corresponding information in the request/information 800 (here, I d1: PLMN1, TAC1 and 1d2: PLMN2, TAC2).

Thereupon, the device detaches from the management network slice (S660) and attaches to the new slice (S670).

That is, the device updates its own database with the thus provided network slice information and (initiates and) waits for the detach from the management network slice. On receiving e.g. UE context release from the management network slice (MME), the device detaches from the management network slice and starts scanning the network/frequency again with the identification (TAI or PLMN & TAC) of the service-related network slice present in its database for the service required. Once the attach with the applicable/suited service-related network slice is complete, the device accesses the service, with enhanced efficiency.

As evident from the above, the first exemplary variant of network slice discovery according to one or more embodiments is a two step/stage process, with step/stage 1of attaching to the management network slice (for accessing the Network Slice Manager), and step/stage 2 of requesting for a particular service via the management network slice, getting network slice details and identifying as well as attaching to the corresponding (service-related) network slice.

When the device makes a subsequent attach attempt to the same service-related network slice, it is relatively easier for the device as the history of any earlier attach is already present in its database. The history of any earlier attach is present in the database as a map (key value pair) of service required versus TAI, which information is provided by the NSM in a preceding attach attempt. Consequently, the device may directly attach to the same slice to which it attached earlier for the same service. However, if the device is unable to find an entry for the currently required service in its map, it searches for the management slice entry in the map and attaches to the management slice in order to register its new request. The management slice provides the new slice identification, which is then updated by the device in its database, and the device detaches and attaches to the new slice, as explained in detail beforehand.

Accordingly, when a database of a communication device is updated with acquired network slice identification information (i.e. TAI or PLMN & TAC) and network slice type information as the registered network slice mapping, the service-related network slice can be identified from the registered network slice mapping when the service is a service for which registration of the network slice mapping has previously been performed.

In the following, a second exemplary variant according to one or more example embodiments is described. For illustrative purposes (yet without intention of limitation), the second exemplary variant could be denoted as network slice discovery based on slice ID in (broadcasted) master system information.

In the second exemplary variant, the network slice identification information is/comprises a network slice identifier (or, stated in other words, slice identity) which is assigned to a service-related network slice.

Example embodiments relating to the second exemplary variant are, in principle, based on the following considerations.

The MIB or Master Information Block is an important message or information that is broadcasted by a base station element such as the eNodeB in LTE, irrespective of any user's presence. The MIB is first among other system information blocks or SI Bs, which are also broadcasted by the base station element such as the eNodeB in LTE. The MIB is transmitted using a physical layer channel called PBCH or Physical Broadcast Channel on the downlink.

FIG. 12 shows an example of contents of a system information broadcast in the second exemplary variant according to one or more example embodiments. Specifically, FIG. 12 shows the 24 bit information of the MIB 1200 according to current (status of) standardization.

As shown in FIG. 12, the MIB is structured as follows.
3 bits for system bandwidth
3 bits for PHI CH information, including
1 bit to indicate norm al or extended PHI CH
2 bit to indicate the PHI CH Ng value
8 bits for system frame number
10 bits are reserved for future use In FIG. 12, the 10-bit spare parameter of the MIB is highlighted by bold typeface, as these 10 spare bits according to current (status of) standardization are useable for/as network slice identification information in the present variant. That is, a predetermined number (sub-/set) of bits out of these 10 spare bits in the MIB are used to convey a network slide identifier in the master system information broadcast, e.g. the eNodeB transmitting this MIB information.

An accordingly coded bit string (conveyed in the 10-bit spare parameter of the MIB) can be used as a network slice identifier, i.e. a network slice identification information which helps to differentiate available/overlapping network slices. That is, the network slice identifier is represented by a predetermined number of bits, and the network slice identification information is coded in the information of the master information block using the predetermined number (sub-/set) of bits out of currently undefined spare bits in the master information block.

Based thereon, each network slice has its own (unique) Slice ID as its network slice identification information. For example, the correlation/assignment as shown in FIG. 13 can apply.

FIG. 13 shows an example of contents of a network slice information mapping/database in the second exemplary variant according to one or more example embodiments.

In the example network slice information mapping/database 1300 shown in FIG. 13, 4 bits out of the 10 spare bits are used for/as a network slice identifier, but this is not limiting and any other number between 1 and 10 can be used, depending e.g. on the number of network slices to be identified. Also, the bit string 1000 is adopted to identify a default slice, but this is not limiting and any other bit string can be used for identifying a default slice or no default slice can be identified as such.

Accordingly, a corresponding network slice mapping is registered in a communication device (i.e. its database) as well as a network element or function (which is aware of any available (service-related) network slices so as to instruct a base station element such as the eNodeB in LET accordingly to broadcast correspondingly coded data).

Figure 10:
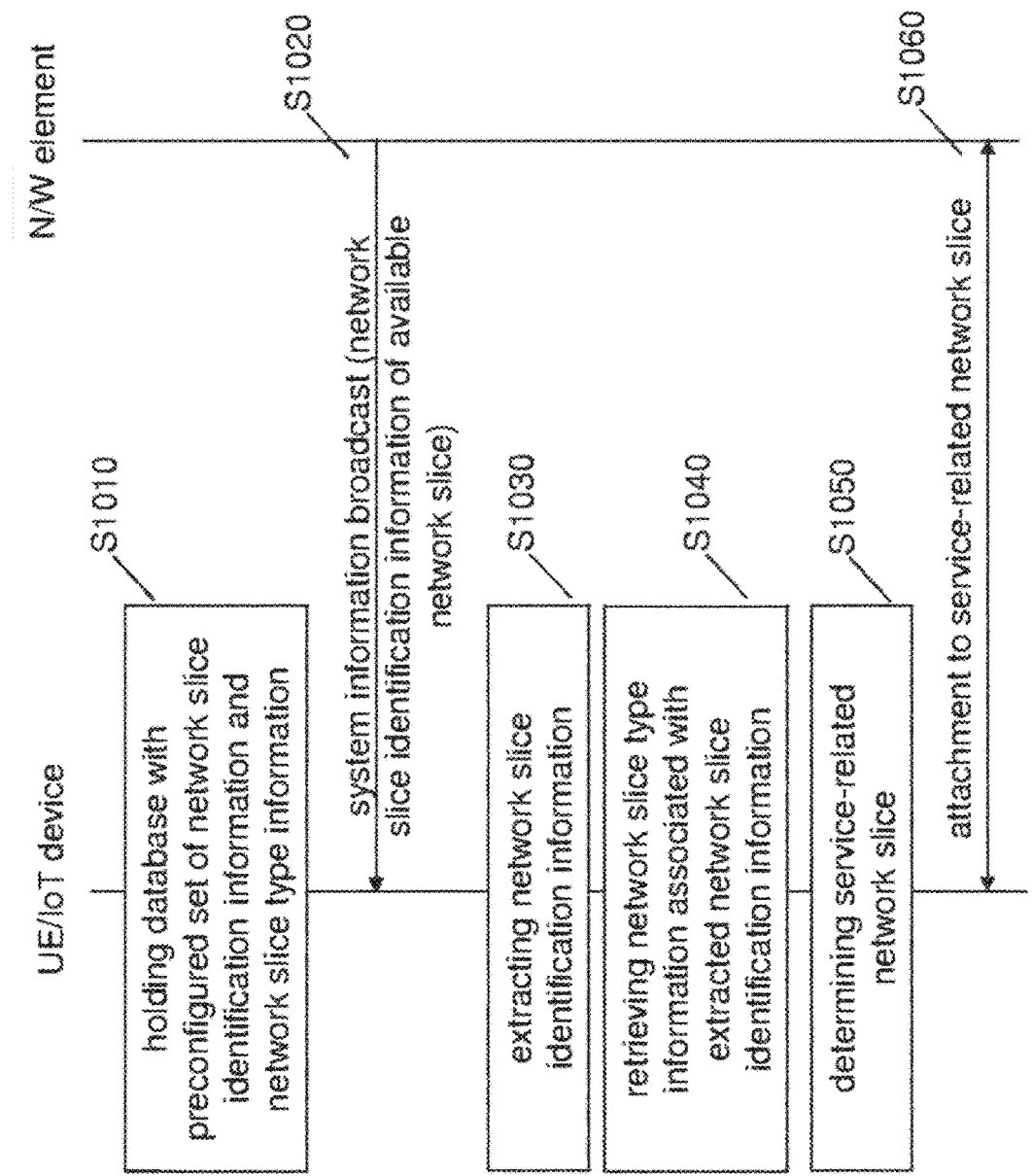
FIG. 10 shows a conceptual signaling diagram illustrating an example of a procedure in a second exemplary variant according to one or more example embodiments.

FIG. 10 shows a conceptual signaling diagram illustrating an example of a procedure in a second exemplary variant according to one or more example embodiments. In FIG. 10, a communication device (configured to perform the method illustrated in FIG. 2) is exemplified by "UE/IoT device", and a network element or function (configured to perform the method illustrated in FIG. 3) is exemplified by "N/W element".

As shown in FIG. 10, the UE/IoT device can hold a database with a preconfigured set of a network slice identification information and a network slice type information for service-related network slices in the overlapping network slice deployment as the registered network slice mapping (S1010). By way of this operation, the registration of the network slice mapping can be enabled/facilitated.

For providing the information regarding a network slice mapping, the N/W element can issue a network slice identification information of an available network slice in a broadcasted system information. As mentioned above, the broadcasted system information (or, stated in other words, the system information broadcast) comprises a system information of a master information block (MIB). That is, the MIB can be scanned by the UE/IoT device. In this regard, it is noted that the UE/IoT device can receive and scan various MIBs, one for each carrier frequency or frequency band.

Then, the UE/IoT device can extract a network slice identification information of an available network slice from the broadcasted system information (S1030), retrieve the network slice type information associated with the extracted network slice identification information from the registered network slice mapping or, stated in other words, based on its aforementioned network slice information mapping/database (S1040), and determine the service-related network slice (S1050). By way of these operations, the identification of the service-related network slice can be enabled/facilitated.

Further, the UE/IoT device can finally attach to the identified service-related network using its network slice identification information (Slice ID) for utilizing the service in the overlapping network slice deployment (S1060).

For enabling a further understanding of the second exemplary variant, the following description of some conceivable implementation/realization approaches is given.

Figure 11:
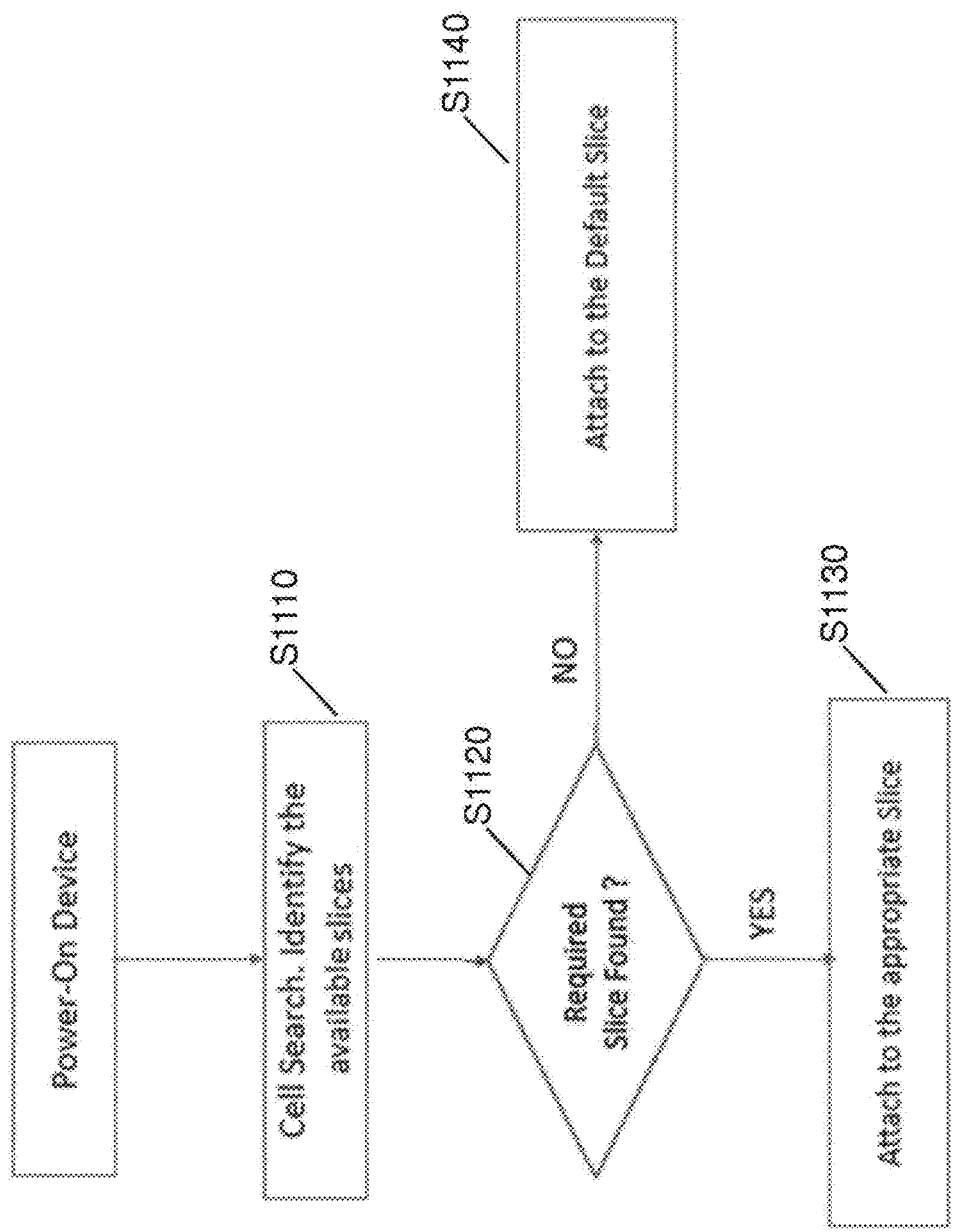
FIG. 11 shows a flowchart illustrating an example of a method, operable at or by a communication device, in the second exemplary variant according to one or more example embodiments.

FIG. 11 shows a flowchart illustrating an example of a method, operable at or by a communication device, in the second exemplary variant according to one or more example embodiments.

When the device powers up, it performs N/W discovery or cell search, thereby collecting information on available radio networks and network slices (S1110). For example, the device can synchronize to different carriers or bands (in its PLMN network) one by one and (attempt to) validate the Slice ID (bit string) provided in the (10-bit spare bits in the) MIB with the Slice ID corresponding to the desired/necessary service, i.e. the Slice ID retrievable for the service from device database. That is to say, the device checks whether the required network slice for the service is found in the network, i.e. the corresponding Slice ID is found in the MIB (S1120).

If the Slice ID match is successful, the device proceeds with the attach to the applicable/suited network slice (S1130), otherwise it moves on to the next best carrier frequency or frequency band. In the end, if no applicable/suited network slice is found in the network, the device proceeds with the attach to the default network slice (S1140).

That is, in identification of the service-related network slice, there may be determined the service-related network slice corresponding to the extracted network slice identification information as the service-related network slice when the retrieved network slice type information conforms to the service, or a default service-related network slice corresponding to the extracted network slice identification information as the service-related network slice when there is no retrieved network slice type information conforming to the service is found.

As evident from the above, one (available) network slice can be presented/identified in each MIB transmitted by a network element such as the eNodeB. Accordingly, plural (available network slices can be presented/identified in plural MIB s transmitted by plural network element such as the eNodeBs and/or on plural carrier frequencies or frequency bands).

Figure 14:
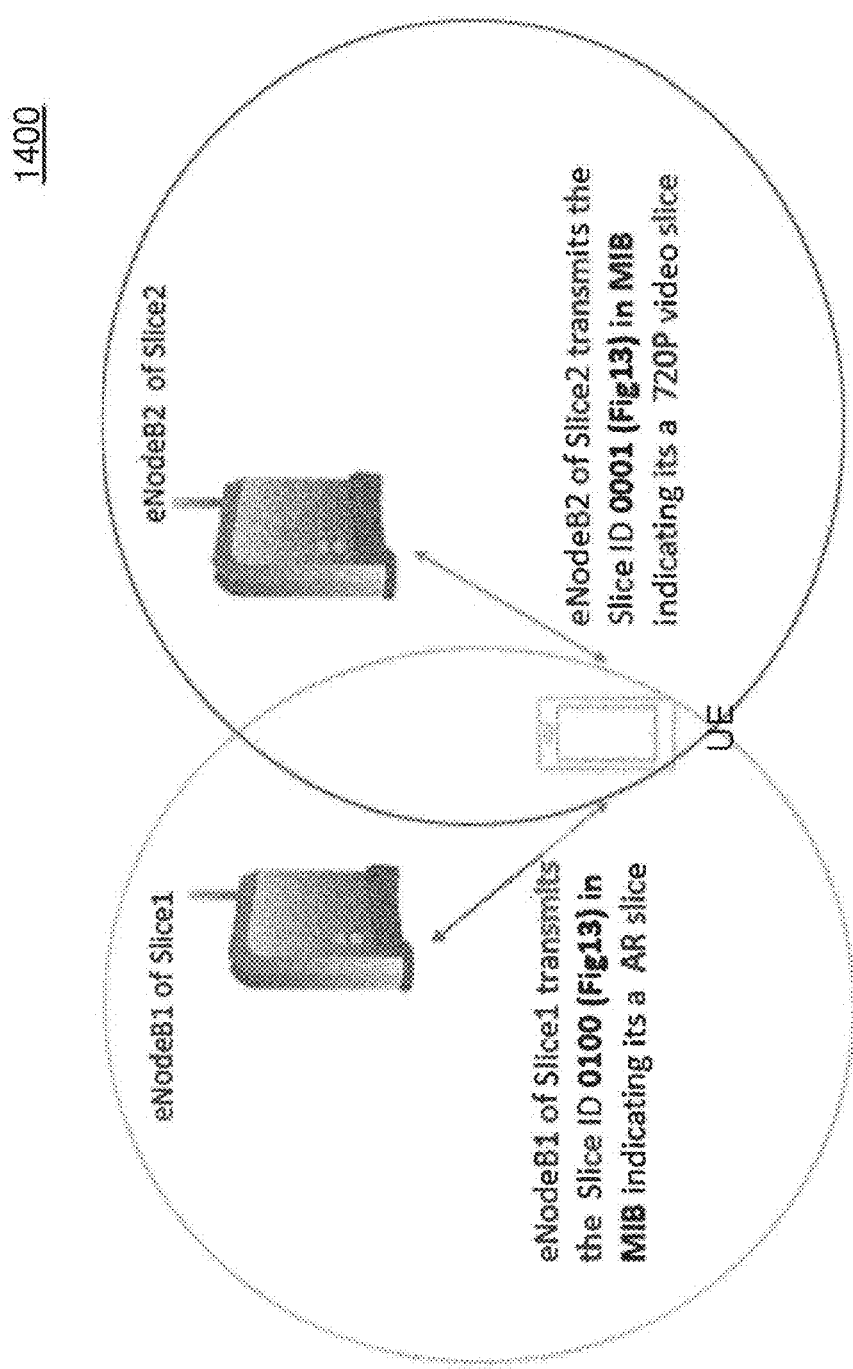
FIG. 14 shows an example of a conceptual scenario for explanation of the second exemplary variant according to one or more example embodiments.

FIG. 14 shows an example of a conceptual scenario for explanation of the second exemplary variant according to one or more example embodiments.

In the example scenario 1400 shown in FIG. 14, it is assumed that eNodeB1 belongs to N/W slice 1 (or, stated in other words, has available or can provide (service by) N/W slice 1), which is configured as AR slice, and eNodeB2 belongs to N/W slice 2 (or, stated in other words, has available or can provide (service by) N/W slice 2), which is configured as 720P Video Slice.

Accordingly, assuming the example correlation/assignment of FIG. 13, the MIB transmitted by eNodeB1 has 4 spare bits set to 0100 indicating/identifying (it as) AR Slice, and the MIB transmitted by eNodeB2 has 4 spare bits set to 0001 indicating/identifying (it as) 720P video slice.

The UE thus obtains network slice identification information (i.e. 0100, 0001) for two available service-related network slices, which enables the UE to retrieve corresponding network slice type information (i.e. AR Slice, 720P video slice) of any available service-related network slice and to determine the applicable/suitable service-related network slice based thereon.

As evident from the above, the second exemplary variant of network slice discovery according to one or more embodiments is a one step/stage process, with the step/stage of getting network slice details and identifying as well as attaching to the corresponding (service-related) network slice on the basis of held information with a preconfigured set of network slice identification information and network slice type information for service-related network slices.

The aforementioned techniques are advantageous in any systems or deployments implementing a network slicing technique, such as e.g. a 3GPP 5 G/NR (Release-15) system.

The above-described methods, procedures and functions may be implemented by respective functional elements, entities, modules, units, processors, or the like, as described below.

While in the foregoing example embodiments of the present disclosure are described mainly with reference to methods, procedures and functions, corresponding example embodiments of the present disclosure also cover respective apparatuses, entities, modules, units, network nodes and/or systems, including both software and/or hardware thereof.

Respective example embodiments of the present disclosure are described below referring to FIGS. 15 and 16, while for the sake of brevity reference is made to the detailed description of respective corresponding configurations/set-ups, schemes, methods and functionality, principles and operations according to FIGS. 1 to 14.

Figure 15:
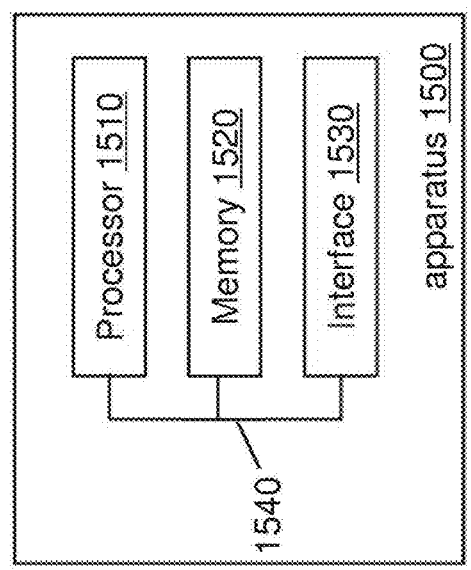
FIG. 15 shows a schematic diagram illustrating an example of a structure of apparatuses according to one or more example embodiments.
Figure 16:
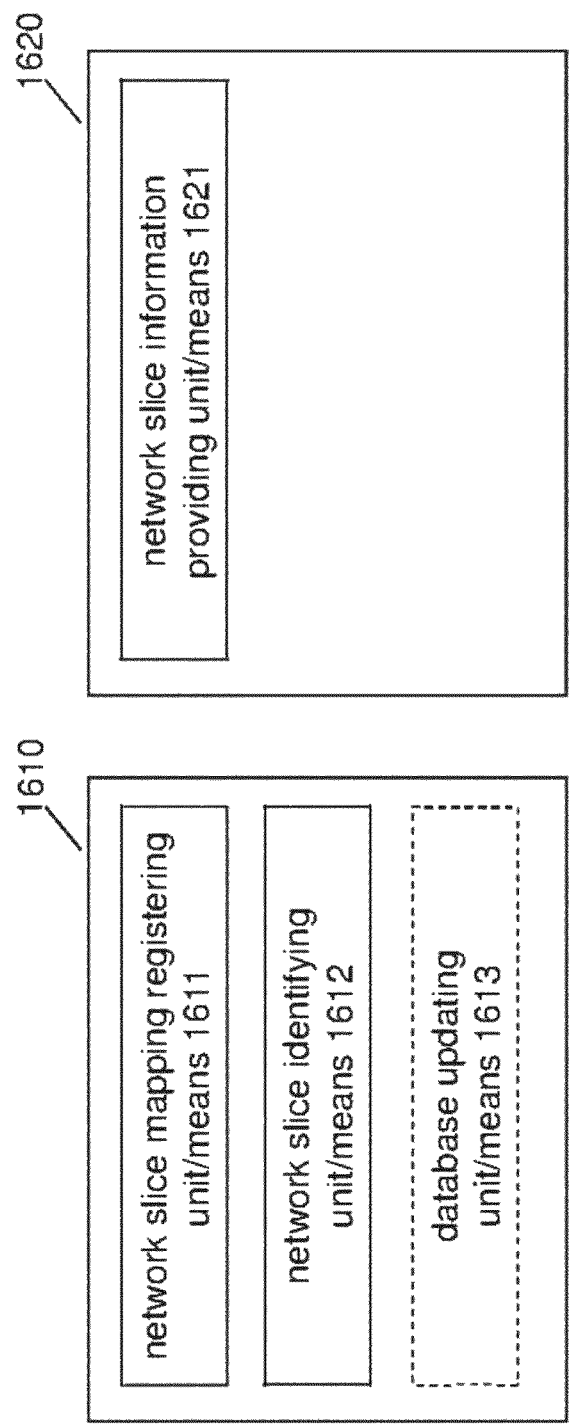
FIG. 16 shows a schematic diagram illustrating another example of a functional structure of apparatuses according to one or more example embodiments.

In FIGS. 15 and 16, the blocks are basically configured to perform respective methods, procedures and/or functions as described above. The entirety of blocks are basically configured to perform the methods, procedures and/or functions as described above, respectively. With respect to FIGS. 15 and 16, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 15 and 16, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to one or more example embodiments.

FIG. 15 shows a schematic diagram illustrating an example of a structure of apparatuses (including any structural and/or functional elements or functions) according to example embodiments of the present disclosure.

As indicated in FIG. 15, according to example embodiments of the present disclosure, an apparatus 1500 may comprise at least one processor or processing circuitry 1510 and at least one memory or storage circuitry 1520 (and possibly also at least one interface or I/O circuitry 1530), which may be operationally connected or coupled, for example by a bus 1540 or the like, respectively.

The processor 1510 and/or the interface 1530 of the apparatus 1500 may also include a modem or the like to facilitate communication over a (hardwire or wireless) link, respectively. The interface 1530 of the apparatus 1500 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 1530 of the apparatus 1500 is generally configured to communicate with at least one other apparatus, device, node or entity (in particular, the interface thereof).

The memory 1520 of the apparatus 1500 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the example embodiments of the present disclosure. Further, the memory 1520 of the apparatus 1500 may (comprise a database to) store any data, information, or the like, which is used in the operation of the apparatus or any method/procedure.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 1500 is suitable for use in practicing one or more of the example embodiments of the present disclosure, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to example embodiments of the present disclosure, the thus illustrated apparatus 1500 may represent or realize/embody a (part of a) communication-enabled device capable of communicating with a network element or function of a communication system implementing a network slicing technique, i.e. a communication device such as e.g. a mobile device, an IoT device, a sensor communicable in a 5 G system. Hence, the apparatus 1500 may be configured to perform a procedure and/or exhibit a functionality and/or implement a mechanism, as described for a UE/IoT device, in any one of FIGS. 1, 2, 4 to 7, 10, 11 and 14.

Accordingly, the apparatus 1500 may be caused or the apparatus 1500 or its at least one processor 1510 (possibly together with computer program code stored in its at least one memory 1520), in its most basic form, is configured to register a network slice mapping between a network slice identification information and a network slice type information for at least one service-related network slice in an overlapping network slice deployment, said network slice type information being indicative of a service-related capability of the at least one service-related network slice, and to identify a service-related network slice in the overlapping network slice deployment on the basis of the registered network slice mapping and a service.

According to example embodiments of the present disclosure, the thus illustrated apparatus 1500 may represent or realize/embody a (part of a) network element or function of a communication system implementing a network slicing technique, such as a network element or function implementing the management network slice and/or a network element or function implementing a home subscriber system, wherein such network element or function is (directly or indirectly) communicable with a communication device such as e.g. a mobile device, an IoT device, a sensor communicable in a 5 G system. Hence, the apparatus 1500 may be configured to perform a procedure and/or exhibit a functionality and/or implement a mechanism, as described for a network slice and/or corresponding network entity, in any one of FIGS. 1, 3 to 7, 10, 11 and 14.

Accordingly, the apparatus 1500 may be caused or the apparatus 1500 or its at least one processor 1510 (possibly together with computer program code stored in its at least one memory 1520), in its most basic form, is configured to provide, to a communication-enabled device, an information regarding a network slice mapping between a network slice identification information and a network slice type information for at least one service-related network slice in an overlapping network slice deployment, said network slice type information being indicative of a service-related capability of the at least one service-related network slice, wherein said information facilitating identification of a service-related network slice for a service in the overlapping network slice deployment.

As mentioned above, an apparatus according to example embodiments of the present disclosure may be structured by comprising respective units or means for performing corresponding operations, procedures and/or functions. For example, such units or means may be implemented/realized on the basis of an apparatus structure, as exemplified in FIG. 15, i.e. by at least one processor 1510, at least one memory 1520, at least one interface 1530, or any combination thereof.

FIG. 16 shows a schematic diagram illustrating another example of a functional structure of apparatuses (including any structural and/or functional elements or functions) according to example embodiments of the present disclosure.

It is to be noted that the individual apparatuses shown in FIG. 16 are inherently independent from each other but could be operable to interwork, i.e. example embodiments of the present disclosure cover any one of these apparatuses alone or any combination of such apparatuses (including one or more of any one of these apparatuses).

As shown in FIG. 16, an apparatus 1610 according to example embodiments of the present disclosure may represent a (part of a) communication-enabled device capable of communicating with a network element or function of a communication system implementing a network slicing technique. Such apparatus may comprise (at least) a unit or means for registering a network slice mapping between a network slice identification information and a network slice type information for at least one service-related network slice in an overlapping network slice deployment, said network slice type information being indicative of a service-related capability of the at least one service-related network slice (denoted as network slice mapping registering unit/means 1611), and a unit or means for identifying a service-related network slice in the overlapping network slice deployment on the basis of the registered network slice mapping and a service (denoted as network slice identifying unit/means 1612).

As evident from the above, the network slice mapping registering unit/means 1611 and the network slice identifying unit/means 1612 may optionally exhibit/realize various functionalities. As one example, the network slice mapping registering unit/means 1611 may comprise or represent (at least) one or more of a unit or means for attaching to a management network slice, a unit or means for requesting a network slice information of a service-related network slice suited for the service from the management network slice, a unit or means for acquiring, as the requested network slice information, a network slice identification information and a network slice type information for a service-related network slice suited for the service from the management network slice, a unit or means for detaching from the management network slice, a unit or means for capturing a network slice identification information of the management network slice in the overlapping network slice deployment using an operator database, a unit or means for scanning a broadcasted system information for the captured network slice identification information of the management network slice, a unit or means for initiating attachment to the management network slice when the captured network slice identification information is found in the scanned system information, a unit or means for providing an information about the service, such as application details and/or quality requirements of the service, for a network element or function implementing the management network slice. As another example, the network slice mapping registering unit/means 1611 may comprise or represent (at least) a unit or means for holding a database with a preconfigured set of a network slice identification information and a network slice type information for service-related network slices in the overlapping network slice deployment as the registered network slice mapping. Also, for example, the network slice identifying unit/means 1612 may comprise or represent (at least) one or more of a unit or means for extracting a network slice identification information of any available network slice from a broadcasted system information, a unit or means for retrieving the network slice type information associated with the extracted network slice identification information from the registered network slice mapping, a unit or means for determining the service-related network slice corresponding to the extracted network slice identification information as the service-related network slice when the retrieved network slice type information conforms to the service, and a unit or means for determining a default service-related network slice corresponding to the extracted network slice identification information as the service-related network slice when there is no retrieved network slice type information conforming to the service is found.

Further, the apparatus 1610 may optionally also comprise, for example, a unit or means for updating a database with the acquired network slice identification information and network slice type information as the registered network slice mapping (denoted as database updating unit/means 1613).

As shown in FIG. 16, an apparatus 1620 according to example embodiments of the present disclosure may represent a (part of a) network element or function of a communication system implementing a network slicing technique. Such apparatus may comprise (at least) a unit or means for providing, to a communication-enabled device, an information regarding a network slice mapping between a network slice identification information and a network slice type information for at least one service-related network slice in an overlapping network slice deployment, said network slice type information being indicative of a service-related capability of the at least one service-related network slice, wherein said information facilitating identification of a service-related network slice for a service in the overlapping network slice deployment (denoted as network slice information providing unit/means 1621).

As evident from the above, the network slice information providing unit/means 1621 may optionally exhibit/realize various functionalities. As one example, the network slice information providing unit/means 1621 may comprise or represent (at least) one or more of a unit or means for obtaining a request for a network slice information of a service-related network slice suited for the service via a management network slice in the overlapping network slice deployment, and a unit or means for issuing, as the requested network slice information, a network slice identification information and a network slice type information for a service-related network slice suited for the service via the management network slice.

For further details regarding the operability/functionality of the individual apparatuses (or units/means thereof) according to example embodiments of the present disclosure, reference is made to the above description in connection with any one of FIGS. 1 to 14, respectively.

According to example embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to example embodiments of the present disclosure, a system may comprise any conceivable combination of any depicted or described apparatuses and other network elements or functional entities, which are configured to cooperate as described above.

In general, it is to be noted that respective functional blocks or elements according to above described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Such software may be software code independent and can be specified using any known or future developed programming language, such as e.g. Java, C++, C, and Assem bier, as long as the functionality defined by the method steps is preserved. Such hardware may be hardware type independent and can be implemented using any known or future developed hardware technology or any hybrids of these, such as MOS (Metal Oxide Semiconductor), CMOS (Complementary Metal Oxide Semiconductor), Bi MOS (Bipolar Metal Oxide Semiconductor), Bi CMOS (Bipolar Complementary Metal Oxide Semiconductor), EGL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing network slice discovery in an overlapping network slice deployment. Such measures exemplarily comprise registration of a network slice mapping between a network slice identification information and a network slice type information for at least one service-related network slice in an overlapping network slice deployment, said network slice type information being indicative of a service-related capability of the at least one service-related network slice, and identification of a service-related network slice in the overlapping network slice deployment on the basis of the registered network slice mapping and a service.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from its scope as disclosed herein.

LIST OF ACRONYMS AND ABBREVIATIONS

3GPP 3rd Generation Partnership Project
AMBR Aggregate Maximum Bit Rate
AR Augmented Reality
CCTV Closed Circuit Television
GBR Guaranteed Bit Rate
HD High Definition
HSS Home Subscriber System
IoT Internet of Things
LAN Longitude
LAT Latitude
LTE Long Term Evolution
MCC Mobile Country Code
MGMT Management
MIB Master Information Block
MME Mobility Management Entity
MNC Mobile Network Code
N/W Network
NR New Radio
NSM Network Slice Manager
P-GW Packet Data Network Gateway
PBCH Physical Broadcast Channel
PCRF Policy and Charging Rules Function
PHICH Physical Hybrid Automatic Repeat Request Indicator Channel PLMN Public Land Mobile Network
QCI QoS Class identifier
QoS Quality of Service
S-GW Serving Gateway
SD Standard Definition
SIB System Information Block
TAC Tracking Areas Code
TAI Tracking Area Identifier
UE User Equipment
URL Uniform Resource Locator
VR Virtual Reality

The invention claimed is:

1. A method comprising:
registering a network slice mapping between a network slice identification and a network slice type information for at least one service-related network slice in an overlapping network slice deployment, the network slice type information being indicative of a service-related capability of the at least one service-related network slice, and
identifying the service-related network slice in the overlapping network slice deployment based on the registered network slice mapping and a service.

2. The method according to claim 1, wherein the network slice identification comprises a tracking area identity which is assigned to the service-related network slice.

3. The method according to claim 1, the registering comprising:
attaching to a management network slice in the overlapping network slice deployment,
requesting a network slice information of the service-related network slice suited for the service from the management network slice,
acquiring, as the requested network slice information, the network slice identification and the network slice type information for the service-related network slice suited for the service from the management network slice, and
detaching from the management network slice.

4. The method according to claim 1, wherein the network slice identification comprises a network slice identifier which is assigned to the service-related network slice.

5. The method according to claim 1, the identifying comprising:
extracting the network slice identification of an available network slice from a broadcasted system information,
retrieving the network slice type information associated with the extracted network slice identification from the registered network slice mapping, and
determining the service-related network slice corresponding to the extracted network slice identification as the service-related network slice when the retrieved network slice type information conforms to the service.

6. An apparatus comprising:
at least one processor; and
at least one memory storing instructions that, when executed by the at least one processor, cause the apparatus to at least perform:
registering a network slice mapping between a network slice identification and a network slice type information for at least one service-related network slice in an overlapping network slice deployment, the network slice type information being indicative of a service-related capability of the at least one service-related network slice, and
identifying the service-related network slice in the overlapping network slice deployment based on the registered network slice mapping and a service.

7. The apparatus according to claim 6, wherein the network slice identification comprises a tracking area identity which is assigned to the service-related network slice.

8. The apparatus according to claim 6, wherein the instructions, when executed by the at least one processor, cause the apparatus to at least perform:
attaching to a management network slice in the overlapping network slice deployment,
requesting a network slice information of the service-related network slice suited for the service from the management network slice,
acquiring, as the requested network slice information, the network slice identification and the network slice type information for the service-related network slice suited for the service from the management network slice, and
detaching from the management network slice.

9. The apparatus according to claim 6, wherein the network slice identification comprises a network slice identifier which is assigned to the service-related network slice.

10. The apparatus according to claim 6, wherein the instructions, when executed by the at least one processor, cause the apparatus to at least perform:
extracting the network slice identification of an available network slice from a broadcasted system information,
retrieving the network slice type information associated with the extracted network slice identification from the registered network slice mapping, and
determining the service-related network slice corresponding to the extracted network slice identification as the service-related network slice when the retrieved network slice type information conforms to the service.

11. An apparatus comprising:
at least one processor; and
at least one memory storing instructions that, when executed by the at least one processor, cause the apparatus to at least perform:
providing, to a communication-enabled device, an information regarding a network slice mapping between a network slice identification and a network slice type information for at least one service-related network slice in an overlapping network slice deployment, the network slice type information being indicative of a service-related capability of the at least one service-related network slice,
wherein the information facilitates identification of the service-related network slice for a service in the overlapping network slice deployment.

12. The apparatus according to claim 11, wherein the network slice identification comprises a tracking area identity which is assigned to the service-related network slice, or the network slice identification comprises a network slice identifier which is assigned to the service-related network slice.

* * * * *